United States Patent [19]

Nishio et al.

[11] Patent Number: 5,290,626
[45] Date of Patent: Mar. 1, 1994

[54] MICROFIBERS-GENERATING FIBERS AND A WOVEN OR NON-WOVEN FABRIC OF MICROFIBERS

[75] Inventors: Hiroaki Nishio; Satoshi Ogata: Yoshimi Tsujiyama, all of Moriyama, Japan

[73] Assignee: Chisso Corporation, Ohsaka, Japan

[21] Appl. No.: 832,743

[22] Filed: Feb. 7, 1992

[30] Foreign Application Priority Data

Feb. 7, 1991 [JP] Japan .................. 3-38156

[51] Int. Cl.$^5$ .............................. D02G 3/02
[52] U.S. Cl. ................... 428/224; 428/373; 428/903; 428/225
[58] Field of Search ............... 428/224, 225, 373, 903

[56] References Cited

U.S. PATENT DOCUMENTS

| | | | |
|---|---|---|---|
| 3,716,614 | 2/1973 | Okamoto et al. | 264/344 |
| 4,663,221 | 5/1987 | Makimura et al. | 428/224 |
| 4,729,371 | 3/1988 | Krueger et al. | 428/296 |
| 4,966,808 | 10/1990 | Kawano | 428/903 |
| 5,124,194 | 6/1992 | Kawano | 428/224 |

FOREIGN PATENT DOCUMENTS 0351318 7/1989 European Pat. Off. .
50-81186 6/1975 Japan .

Primary Examiner—James J. Bell
Attorney, Agent, or Firm—Fay, Sharpe, Beall, Fagan, Minnich & McKee

[57] ABSTRACT

A web or a fibers consisting of microfibers having a fineness of 0.01 denier or less is provided, which web or fibers is obtained by spinning conjugate fibers consisting of microfibers-generating fibers of island-in-sea type, according to melt blown process, the sea component being a thermoplastic resin (polyvinyl alcohol) capable of being removed with a solvent (water) and the island component being a thermoplastic resin (polypropylene) insoluble in the solvent used for the sea component, followed by collecting the spun conjugate fibers in the form of a web or a tow; the resulting composite fibers being thinner than those obtained according to conventional conjugate spinning and the microfibers obtained by removing the sea component also being thinner than fibers obtained from conventional conjugate fibers of island-in-sea type.

7 Claims, No Drawings

MICROFIBERS-GENERATING FIBERS AND A WOVEN OR NON-WOVEN FABRIC OF MICROFIBERS

BACKGROUND OF THE INVENTION

1. Field of the Invention

This invention relates to microfibers-generating fibers and a woven or non-woven fabric of microfibers, obtained by using the microfibers-generating fibers. More particularly it relates to the production of microfibers-generating fibers according to a melt blown process, making it possible to generate microfibers finer than conventional microfibers, and a woven or non-woven fabric using the aforementioned microfibers.

2. Description of the Related Art

Recently, with the high quality and diversity of fiber products, improvement in the feeling of fiber products by the use of microfibers has been researched. Furthermore, with the development of the use applications thereof, demand for microfibers in the fields of synthetic fibers and non-woven fabrics have also been increasing.

As for the processes which produce microfibers, those which remove the sea part of island-in-sea type fibers and use the resulting island part of the fiber as microfibers have been disclosed. For example, Japanese patent publication No. Sho 47-37648 discloses a process of melt-spinning a blend of different kinds of polymers consisting of a polymer for the sea component and a polymer for the island component followed by the removal of the sea component with a solvent. Further, Japanese patent application laid-open No. Sho 60-21904 discloses a process of conjugate-spinning different kinds of polymers into island-in-sea fibers followed by the removal of the sea component. However, since polymers capable of being removed with solvents are generally inferior in their spinnability, it has been difficult to obtain island-in-sea type conjugate fibers having a fineness of a single fiber of 1 denier or less, and hence it has been also difficult to obtain microfibers having a single fiber of 0.01 denier or less from the conjugate fibers.

The process of adding a dispersant in order to disperse the island component finely in the sea component has been proposed. However, this process is undesirable because of the complicated operation involved. Furthermore, there is a problem in that fibers having a fineness of a single fiber of 1 denier or less are inferior in their processability during the post-processing treatment of making the fibers into a non-woven fabric, such as carding.

SUMMARY OF THE INVENTION

The object of the present invention is to provide microfibers-generating fibers capable of generating microfibers having a fineness of a single fiber of 0.01 denier or less, without lowering the processability during the post-processing treatment such as making up the fibers into a non-woven fabric, etc.

The present inventors have done extensive research in solution of the above problem of microfibers-generating fibers and, as a result, have found that the desired fibers can be obtained by spinning the island-in-sea type fibers according to a melt blown process and have therefore completed the present invention.

According to the present invention, there is provided microfibers-generating fibers composed of island-in-sea type conjugate fibers spun according to a melt blown process, the sea part of the conjugate fibers thereof being composed of a thermoplastic polymer capable of being removed with a solvent and the island part thereof being composed of a thermoplastic polymer insoluble in said solvent forming microfibers-containing fibers having a fineness of a single fiber of 0.01 denier or less.

Microfibers, according to the present invention, are obtained by removing the sea part of the above microfibers-generating fibers.

A woven or non-woven fabric, having microfibers of the present invention, is obtained by removing, from a woven or non-woven fabric prepared by using the above microfibers-generating fibers, the sea part contained in said fibers at the time of or after preparation of said woven or non-woven fabric, or by removing the sea part in the above microfibers-generating fibers to obtain microfibers, followed by preparing a woven or non-woven fabric by using the resulting microfibers.

DETAILED DESCRIPTION OF PREFERRED EMBODIMENTS

A woven or non-woven fabric containing the microfibers of the present invention can be obtained by treating the above microfibers-generating fibers by entangling, interlacing or adhering the fibers, and by the removable of the sea part of the fibers at the time of, before or after the above entangling, interlacing or adhering.

As for the polymer constituting the sea part of the microfibers-generating fibers, a thermoplastic polymer capable of being removed with solvents such as water-soluble polyvinyl alcohol, polystylene, stylene-acrylonitrile copolymer, LDPE, etc. are usable. As the solvent, water, toluene, trichloroethylene, perchloroethylene, etc. are usable.

As for the polymer constituting the island part of the microfibers-generating fibers, any of thermoplastic polymers which are insoluble in the sea component and can form independent island parts in the sea part are usable. For example, when a polyvinyl alcohol is used as the sea component, polyolefins such as polyethylene, polypropylene, polyethylene terephtharate, nylon-6, nylon-66, etc. are usable.

The melt blown process employed in the present invention refers to a process of extruding a molten polymer in the form of strands from spinning nozzles, blowing a gas having a high temperature and a high pressure to the strands in the vicinity of the spinning nozzles, and receiving the resulting microfibers-generating fibers on a collecting net provided under the spinning nozzles. Such a process is disclosed in Japanese patent application laid-open No. Sho 55-142757, for example. For obtaining strands of the island-in-sea type, conventional processes using mixed polymers, conjugate spinning nozzles, etc. can be employed. The process of spinning mixed polymers as disclosed in Japanese patent publication No. Sho 47-37648 may preferably be employed since the apparatus is simple.

As for the processes for entangling or interlacing fibers for producing a woven or non-woven fabric containing the microfibers of the present invention, a process of weaving the microfibers or the microfibers-generating fibers or a process of subjecting the microfibers or the microfibers-generating fibers to needle punching or spunlacing may be utilized. As for processes for adhering fibers for producing a woven or non-woven fabric, a process of utilizing an adhesive or a process of subjecting the microfibers or the microfibers-generating fibers to melt-adhesion at contacting points of fibers by a heat-treatment may be utilized.

EXAMPLE 1

An equal weight mixture of a thermoplastic polyvinyl alcohol (MFR at 190° C.: 50, polymerization degree: 400 and saponification value: 62%) with a polypropylene (MFR at 230° C.: 80) was melt-extruded using a die and spinning nozzles of the same type as those disclosed in FIGS. 1 and 2 of Japanese patent application laid-open No. Sho 5-142757 for melt-blowing (hole diameter: 0.3 mm and number of holes: 501) at a spinning temperature of 230° C. and at an extrusion rate of 180 g/min, to spin microfibers-generating fibers while air at 230° C. and under a pressure of 2.2 kg/cm$^2$ was ejected from the die. The resulting microfibers-generating fibers were collected onto a metal net conveyer provided under the spinning nozzles 48 cm apart therefrom to obtain a web having a basis weight of 100 g/m$^2$.

The cross-section of the fibers constituting this web was observed by microscope. Several hundred to several thousand island parts consisting of the polypropylene were dispersed in the sea part consisting of the thermoplastic polyvinyl alcohol. The diameters of the respective island parts varied but fell within a range of 0.005 to 0.5 micron.

The removal of the sea part of the microfibers-generating fibers and subsequent entanglement of microfibers was accomplished by subjecting the web to spunlace processing (water pressure: 70 kg/cm$^2$). A non-woven fabric of a basic weight of 50 g/m$^2$ was obtained which consisted of polypropylene microfibers.

The fiber diameter of the above microfibers-generating fibers, the fiber diameter of the generated microfibers and the strength of the non-woven fabric were measured. The results are shown in Table 1.

EXAMPLE 2

Example 1 was repeated except that the polypropylene used in Example 1 was replaced by a polyethylene (MFR at 190° C.: 50) to obtain a web of microfibers-generating fibers. The web was subjected to spunlace processing in the same manner as in Example 1 to obtain a non-woven fabric of a basis weight of 50 g/m$^2$ consisting of polyethylene microfibers.

The fiber diameter of the above microfibers-generating fibers, the fiber diameter of the generated microfibers and the strength of the non-woven fabric were measured. The results are shown in Table 1.

EXAMPLE 3

A web of microfibers-generating fibers obtained in the same manner as in Example 1 was heat-treated by means of an emboss roll (140° C., linear pressure: 20 kg/cm) to obtain a non-woven fabric of a basis weight of about 100 g/m$^2$.

This non-woven fabric was washed with water at 25° C. to remove the sea part of the microfibers-generating fibers, thereby obtaining a non-woven fabric of a basis weight of about 50 g/m$^2$, consisting of microfibers. The fiber diameter of the microfibers-generating fibers, the fiber diameter of the microfibers constituting the non-woven fabric and the strength of the non-woven fabric were measured. The results are shown in Table 1.

EXAMPLE 4

A web of microfibers-generating fibers of a basis weight of about 100 g/m$^2$, obtained in the same manner as in Example 1, was washed with water at 25° C. to remove the sea part of the microfibers-generating fibers. A web of a basis weight of about 50 g/m$^2$, consisting of microfibers, was obtained. This web was heat-treated by means of an emboss roll (140° C., linear pressure: 20 kg/cm) to obtain a non-woven fabric of a basis weight of about 50 g/m$^2$.

The fiber diameter of the microfibers-generating fibers, the fiber diameter of the microfibers constituting the non-woven fabric and the strength of the non-woven fabric were measured. The results are shown in Table 1.

EXAMPLE 5

The web collected onto the metal net in Example 1 was taken up in the form of sliver to obtain a fiber bundle (103 g/200 cm) consisting of the microfibers-generating fibers.

This fiber bundle was washed with water to obtain a fiber bundle (49 g/200 cm) consisting of polypropylene. The fiber diameter was 0.005 to 0.5 microns.

COMPARATIVE EXAMPLE 1

A polypropylene (MFR at 230° C.: 80) was melt-extruded through the spinning nozzles of a die for melt-blowing (hole diameter: 0.3 mm and number of holes: 501), at a spinning temperature of 230° C. and in an extruded quantity of 180 g/min, to spin microfibers while air at 230° C. and under a pressure of 2.3 kg/cm$^2$ was ejected from the die. The resulting microfibers were collected onto a metal net provided under the spinning nozzles (48 cm apart) to obtain a web of a basis weight of about 50 g/m$^2$.

This web was subjected to spunlace processing in the same manner as in Example 1 to obtain a non-woven fabric of a basis weight of 50 g/m$^2$ consisting of microfibers constituting the non-woven fabric. The strength of the non-woven fabric was measured. The results are shown in Table 1.

In the case of using a simple polypropylene, fibers having a small fineness down to a diameter of 1 micron could not be obtained even in a melt blown process.

COMPARATIVE EXAMPLE 2

A blend consisting of a thermoplastic polyvinyl alcohol (MFR at 190° C.: 50, polymerization degree of 400 and saponification value: 62%) (50 wt. parts), a polypropylene (MFR at 230° C.: 30) (50 wt. parts) and a maleic anhydride-modified polypropylene (maleic anhydride content: 0.5 wt. % and MFR at 230° C.: 30) (5 wt. parts) was melt-extruded through spinning nozzles (hole diameter: 0.6 mm and 200 circular spinning holes) at a spinning temperature of 230° C. and in an extrudation rate of 200 g/min, followed by taking up at a rate of 1,000 m/min to obtain undrawn yarn of microfibers-generating fibers having a fineness of a single fiber of 9 deniers.

This undrawn yarn was drawn to 3 times the original length at a temperature of 90° C. to obtain a drawn yarn of microfibers-generating fibers.

This drawn yarn was subjected to mechanical crimping of 13 crimps/25 mm, followed by cutting to a fiber length of 51 mm to make staple and then making a web of a basis weight of about 100 g/m$^2$ by means of a roller carding machine. This web was subjected to spunlace processing (water pressure: 70 kg/cm$^2$) to simultaneously carry out removal of the sea part of the microfibers-generating fibers and entanglement of microfibers with one another, thereby obtaining a non-woven fabric of a basis weight of 50 g/m$^2$ consisting of polypropylene microfibers.

The fiber diameter of the microfibers-generating fibers, the fiber diameter of the generated microfibers and the strength of the web were measured. The results are shown in Table 1.

According to conventional spinning processes, even if a dispersant (maleic anhydride-modified polypropylene) is used, the diameter of the resulting microfibers reaches, at the highest, only about 0.01 microns, and, in spite of a thick fiber diameter, the strength of the resulting non-woven fabric remains about the same value as those of the non-woven fabrics of Example 1 or Example 2.

TABLE 1

|  | Average fiber diameter *1/ Fineness (μm)/(denier) | Breaking strength of non-woven fabric *2 (kg) | Diameter of generated micro-fibers *1/ Fineness (μm)/(denier) |
| --- | --- | --- | --- |
| Example 1 | 10.5/0.7 | 3.1 | 0.005~0.5/ 0.00000016~0.0016 |
| Example 2 | 9.8/0.6 | 1.2 | 0.005~0.5/ 0.00000017~0.0017 |
| Example 3 | 10.2/0.7 | 3.0 | 0.005~0.5/ 0.00000016~0.0016 |
| Example 4 | 10.9/0.8 | 1.9 | 0.005~0.5/ 0.00000016~0.0016 |
| Comr. ex. 1 | 10.0/0.7 | 3.5 | — |
| Comp. ex. 2 | 21.6/3.0 | 3.0 | 0.01~4.0/ 0.00000064~0.1 |

*1: Fiber diameter, measured according to image-processing of an electric microscope image.
*2: Sample of a width of 5 cm and a length of 10 cm in the mechanical direction (after washing with water) was measured by means of a tensile tester (basis weight: calculated in terms of 50 g).

As apparent from the data shown in Table 1, since the microfibers-generating fibers of the present invention are produced by a melt blown process, it is possible to obtain the fibers in the form of a web of island-in-sea type conjugate fibers having fineness of a single fiber of the microfibers-generating fibers of 1 denier or less, while the processability at the post-processing step for making up the web into a non-woven fabric is not prevented. Further, since the microfibers-generating fibers themselves can be made as thin as 1 denier or less, it is possible to make the diameter of the resulting microfibers 0.01 denier or less. When a woven or non-woven fabric consisting of such fine microfibers is used as a stock for filters, for example, it is possible to obtain a filter having a better filtration accuracy than those of conventional filters. Further, since no dispersant is used for producing microfibers-generating fibers, the resulting microfibers can retain the physical properties of a thermoplastic resin itself as the stock for the fibers.

A woven or non-woven fabric obtained by using the microfibers-generating fibers of the present invention is usable in a filter such as air filters for a clean room, surgical or industrial face masks, wiping cloths, battery separators, surgical gowns, cover stocks for baby diapers, etc.

What we claim is:

1. Microfibers-generating fibers consisting essentially of island-in-sea type conjugate fibers spun according to a melt blown process, the sea part of said conjugate fibers being composed of a thermoplastic polymer capable of being removed with a solvent and the island part thereof being composed of a thermoplastic polymer insoluble in said solvent and forming microfibers having a fineness of a single fiber of 0.01 denier or less.

2. Microfibers-generating fibers according to claim 1, wherein said solvent is water, said thermoplastic polymer capable of being removed with said solvent is a polyvinyl alcohol and said thermoplastic polymer insoluble in said solvent is a polypropylene.

3. Microfibers obtained by removing the sea part of said microfibers-generating fibers as set forth in claim 1.

4. A woven or non-woven fabric having microfibers obtained by removing, from a woven or non-woven fabric prepared by using microfibers-generating fibers as set forth in claim 1, the sea part contained in said fibers at the time of or after preparation of said woven or non-woven fabric.

5. A woven or non-woven fabric according to claim 4, wherein said solvent is water, said thermoplastic polymer capable of being removed with said solvent is a polyvinyl alcohol and said thermoplastic polymer insoluble in said solvent is a polypropylene.

6. A woven or non-woven fabric having microfibers obtained by removing the sea part in microfibers-generating fibers as set forth in claim 1 to obtain microfibers, and preparing a woven or non-woven fabric by using the resulting microfibers.

7. A woven or non-woven fabric according to claim 6, wherein said solvent is water, said thermoplastic polymer capable of being removed with said solvent is a polyvinyl alcohol, and said thermoplastic polymer insoluble in said solvent is a polypropylene.

* * * * *